United States Patent
Khaleeluddin et al.

(10) Patent No.: US 12,072,805 B2
(45) Date of Patent: Aug. 27, 2024

(54) SYSTEM AND METHOD TO ENTER AND EXIT A CACHE COHERENT INTERCONNECT

(71) Applicant: ARTERIS, INC., Campbell, CA (US)

(72) Inventors: Mohammed Khaleeluddin, Union City, CA (US); Michael Frank, Sunnyvale, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 17/717,148

(22) Filed: Apr. 11, 2022

(65) Prior Publication Data

US 2023/0325316 A1  Oct. 12, 2023

(51) Int. Cl.
*G06F 12/0817* (2016.01)

(52) U.S. Cl.
CPC .... *G06F 12/0828* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 11,249,908 | B1* | 2/2022 | Jahren | G06F 9/546 |
| 2003/0167367 | A1* | 9/2003 | Kaushik | G06F 13/4081 |
| | | | | 710/302 |
| 2010/0098076 | A1* | 4/2010 | Levy | H04Q 11/0067 |
| | | | | 370/390 |
| 2016/0188471 | A1* | 6/2016 | Forrest | G06F 12/0828 |
| | | | | 711/119 |
| 2016/0188472 | A1 | 6/2016 | Forrest et al. | |
| 2016/0350220 | A1* | 12/2016 | Salisbury | G06F 12/0813 |
| 2016/0364333 | A1* | 12/2016 | Brown | G06F 12/084 |
| 2017/0255558 | A1* | 9/2017 | Forrest | G06F 12/0824 |
| 2018/0307619 | A1 | 10/2018 | Kalyanasundharam et al. | |
| 2018/0329819 | A1* | 11/2018 | Hagersten | G06F 12/082 |
| 2019/0205489 | A1* | 7/2019 | de Lescure | G06F 11/1645 |
| 2020/0226081 | A1* | 7/2020 | Kalyanasundharam | |
| | | | | G06F 9/3877 |
| 2020/0285420 | A1 | 9/2020 | Bernat et al. | |
| 2021/0011864 | A1 | 1/2021 | Bernat et al. | |

* cited by examiner

*Primary Examiner* — Nathan Sadler (74) *Attorney, Agent, or Firm* — Jubin Dana; Dana Legal Services (57) ABSTRACT

A cache coherent interconnect connected to one or more agents, using Network Interface Units (NIUs), and also having one or more internal modules, such as a directory, is provided with one or more message builders and message receivers. These message builders and message receivers are provided as additional hardware IP blocks incorporated into the various NIUs and modules. When an agent signals an intention to enter/exit the cache coherent interconnect, a message communicating this information is generated using message builders, and transmitted using the interconnect wiring as a "virtual wire" to one or more message receivers associated with directories that need to be aware of the entry/exit transition of the agent. The directories are provided with tracking engines to manage the entry/exit information and status of the agent. Interconnects may include a broadcast engine to provide distribution to, and aggregate acknowledgements from, a single source to multiple destinations.

11 Claims, 8 Drawing Sheets

SYSTEM AND METHOD TO ENTER AND EXIT A CACHE COHERENT INTERCONNECT

FIELD OF TECHNOLOGY

The present technology is in the field of computer design tools and, more precisely, related to cache coherent interconnects.

BACKGROUND

In a cache coherent interconnect, such as those with a distributed implementation, a set of connected agents such as CPUs, GPUs, etc. may have internal memory caches are kept coherent with each other, so that when a memory location is updated by an agent, all the other agents can see the updated value, even if the memory location that was updated was already cached in another agent. These memory connections are maintained with a set of network interface units (NIUs) (also sometimes called protocol converter components) that are in turn connected to each other through a network-on-chip (NoC) transport interconnect that allows these to be synchronized.

However, in complex systems, asynchronous elements, elements without a memory cache, or elements in which a proxy cache exists within the NIU itself may also be connected. Different connected elements may be functioning using clocks of different speeds, and lead to problems maintaining synchronization across the clock boundaries throughout the system using connections in the interconnect. This can tie up network bandwidth, reducing efficiency, and requires computing cycles to monitor and process, consuming additional power just to maintain the system. Such synchronization has been typically done, for example for ARM microprocessors, by using standard ARM synchronization protocols, but with larger numbers of asynchronous agents, the number of wires and signals that must be maintained using these conventional protocols becomes unwieldy.

Additional complications are created when a participant in the network entirely withdraws or is added to the system. There are protocols for announcing an element's entrance or exit. One example of such CPU with such protocol support is the ARM CPU, which can use a pair of wires (in this case, labeled SysCoReq & SystCoAck) to indicate to the system that they want to enter or exit the coherency domain (e.g. by asserting or de-asserting, respectively, SysCoReq); and will receive from the system an acknowledgment that their status has been changed accordingly (through SysCoAck).

Such a request from a connected cached agent to enter or exit the coherency domain may be sent using wires that directly link to the interconnect component called the directory. The directory is responsible for tracking which connected agents are included in the coherency domain, so that the cache lines in their caches can be tracked, and they can be snooped.

When the directory is aware that a given agent is no longer included in a cache coherent domain, it will ensure no snoop messages are sent to that agent, and it will no longer track the content of that cache. However, connecting all the agents that can dynamically transition using simple wires from each agent to the directory has a set of issues. First, if there are many agents, then the number of wires can become very large, and routing can become a problem. Secondly, if the agents are in a different clock or power domain as the directory, domain crossing components need to be used, which can make additional complications. The consequences for not being connected can be problematic. Third, in the case a CPU or other element drops from the network, but other elements are unaware that this has happened, for example in a "silent eviction", snoop requests to that now absent CPU can launch into infinite loops as they attempt to send messages when there is no receiver to acknowledge.

Therefore, there is a need for a system and method that allows elements in a network to withdraw from, or be added to, a network that allows synchronization of the network to proceed harmoniously and efficiently.

SUMMARY

In accordance with the various aspects and embodiments of the invention, a system and method that allows elements in a network to withdraw from, or be added to, a network that allows synchronization of the network to proceed harmoniously and efficiently. An interconnect is connected to one or more agents (CPUs, GPUs, Memory managers, Peripherals etc.) using network interface units (NIUs). In accordance with some aspects and embodiment of the invention, the interconnect includes one or more internal modules, such as a directory, is a provided with one or more message builders, and additionally with one or more message receivers. These builders and receivers are provided as additional hardware IP blocks, incorporated into the various NIUs. The NIUs are communicating using a transport interconnect. The NIUs are connected to caching agents that have the capability to enter/exit the cache coherent system.

In accordance with some aspects and embodiments of the invention, a directory is connected to the transport interconnect. The directory includes a message builder and a message receiver as well as a tracking engine, to keep track of which connected modules are part of the cache coherent system.

In accordance with some aspects and embodiments of the invention, the interconnect includes a broadcast engine connected to the transport interconnect. The transport interconnect includes at least one message builder and one message receiver, so that a single message directed to multiple destinations can be received and then relayed as multiple messages to the multiple destinations by the broadcast engine, either sequentially or simultaneously.

In accordance with some aspects and embodiments of the invention, a module provided with a message builder is provided with an additional multiplexer, to combine the messages from the message builder into streams with other messages.

In accordance with some aspects and embodiments of the invention, a module provided with a message receiver is provided with an additional demultiplexer, to identify and separate the messages destined for the message receiver from streams containing these and other messages.

In accordance with some aspects and embodiments of the invention, only modules of the interconnect that are connected to elements, such as CPUs that are able to enter or exit the cache coherent system, are provided with a message builder and a message receiver.

By using messages over the network to communicate entry/exit intentions instead of dedicated wires for agents connected to the interconnect, layout space is freed up for communication channels within the design. This presents an architecture of "virtual wires" that allows for more flexibility and efficiency.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention.

Thus, appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

As used herein, an "initiator" and "sender" refer to intellectual property (IP) modules or units and the terms are used interchangeably within the scope and embodiments of the invention. As used herein, a "receiver" and a "target" refer to similar IP modules or units and the terms are used interchangeably within the scope and embodiments of the invention. As used herein, a transaction may be a request transaction or a response transaction. Examples of request transactions include write request and read request.

Before describing in detail the embodiments that are in accordance with invention, it should be observed that the embodiments reside primarily in combinations of method step and apparatus components related to facilitating the invention. Accordingly, the components and method steps have been represented where appropriate by conventional symbols in the drawing showing only those specific details that are pertinent to understanding the embodiments of the present invention so as not to obscure the disclosure with details that will be readily apparent to those of ordinary skill in the art having het benefit of the description herein.

Unless defined otherwise, all technical and scientific terms used herein have the same meaning as commonly understood by one of ordinary skill in the art to which this invention belongs. Any methods and systems, similar or equivalent to those described herein, can also be used in the practice of the invention. Representative illustrative methods and embodiments of systems are also described in accordance with the aspects of the invention.

The invention applies to cache coherent interconnects that have a distributed implementation. In such a distributed implementation, several elements, or components, share memory to gain performance. The various elements with memory cache components are connected through a transport, such as, for instance, a network on chip, and cache lines that connect and synchronize them are tracked by the cache coherent interconnect.

Figure 1:
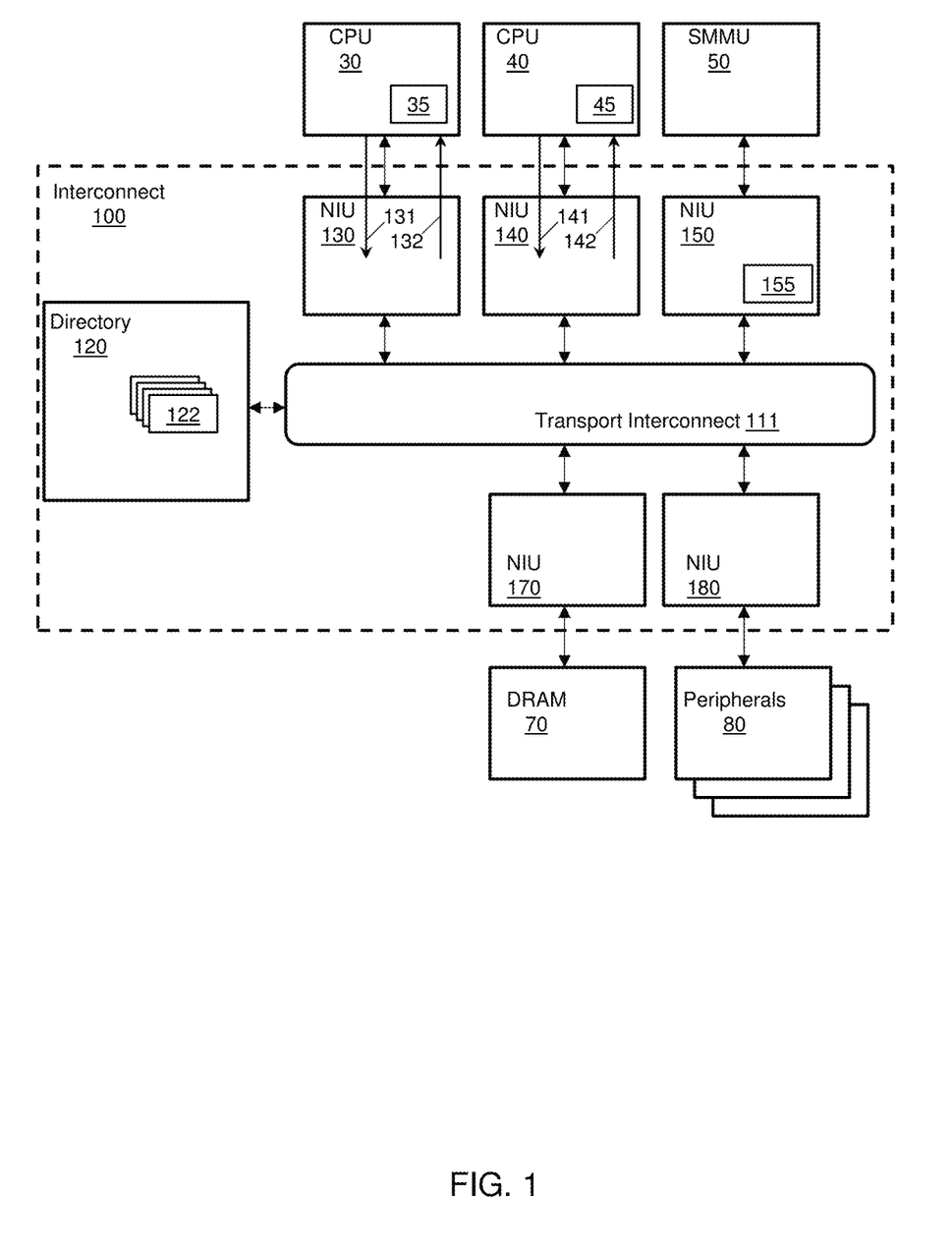
FIG. 1 illustrates a schematic of a cache coherent interconnect with a distributed implementation in accordance with the various aspects and embodiments of the invention.

An example of a distributed cache coherent interconnect can be seen in FIG. 1. In accordance with one example and aspect of the invention, an interconnect 100 provides communication between several agents and elements within a computer system. The interconnect 100 includes a transport interconnect 111, providing wiring that links all elements of the system. The transport interconnect 111 controls and manages the state of cache lines inside the system, so that coherency is maintained.

Agents, such as a first central processing unit (CPU) 30, a second central processing unit (CPU) 40, and a System Memory Management Module (SMMU) 50, are connected through protocol converters, also called network interface units (NIUs) 130, 140, and 150 respectively. The illustrated example also provides connections to elements such as DRAM memory 70 and other peripherals 80 through additional NIUs 170 and 180, respectively.

In addition to the external links provided by the NIUs, the interconnect 100 may also contain internal modules. As shown in FIG. 1, the interconnect 100 includes a directory 120 in accordance with the various aspects and embodiments of the invention. The directory 120 provides snoop filters 122 and stores the addresses of memory in the caches. The directory 120 is also attached to the transport interconnect 111 for communication with the various NIUs.

In accordance with the various aspects and embodiments of the invention, external agents CPU 30 and CPU 40 include memory caches 35 and 45, respectively. In accordance with the various aspects and embodiments of the invention, other external agents, such as the SMMU 50, are not provided with cache, and the corresponding NIU 150 may be configured to provide a proxy cache 155.

It should be noted that, although this illustration shows a representation of a cache coherent interconnect, it will be clear to those skilled in the art that cache coherent interconnects may have many more components than those shown. Furthermore, in accordance with the various aspects and embodiments of the invention, although only one directory is shown in the illustration, cache coherent interconnects can have many directories distributed throughout the design that share the tasks of memory management. Furthermore, in accordance with the various aspects and embodiments of the invention, although the illustration shows wires connecting the CPUs to their associated NIUs to provide the enter/exit information (as may be found in the hardwired handshake used by ARM CPUs), other CPUs may use different techniques to communicate, such as control and status register (CSR) that may communicate instructions that are used for RISC-V processors.

In such a system, elements such as CPUs with cache may elect to, or be required to, enter or exit the cache coherent system. In conventional systems, such a transition will be communicated over individual wires, which will be connected from every sender to every receiver in a point-to-point fashion. This can become a problem if, for instance, the number of elements that can enter or leave the system, or the number of receivers that need to know about the entry/exit, is large. Other challenges, such as different clock or power domain along the route between the module entering/exiting the system is and the receiving modules, can increase the complexity of the implementation.

Figure 2:
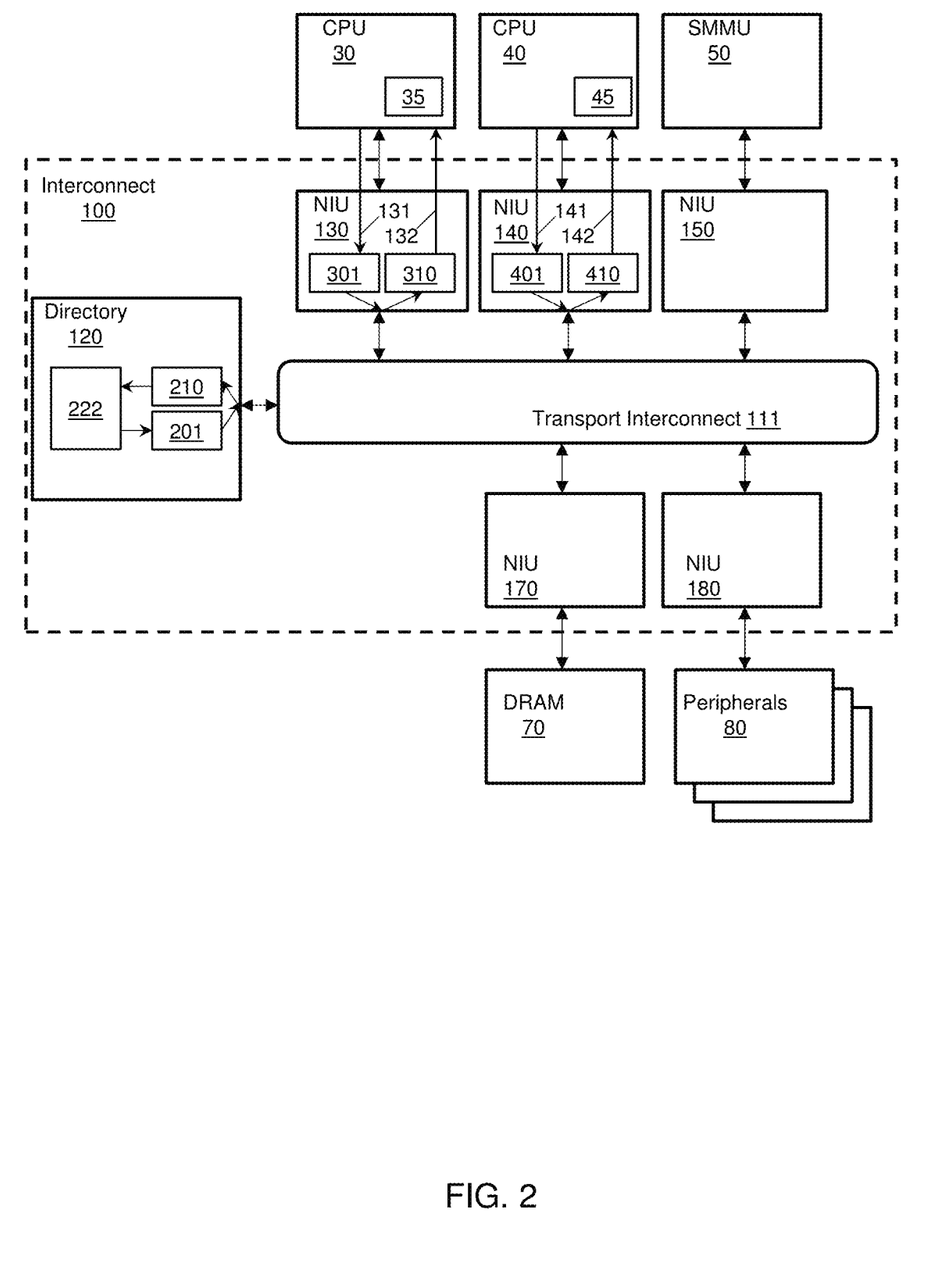
FIG. 2 illustrates a schematic of a cache coherent interconnect with message builders and message receivers in accordance with the various aspects and embodiments of the invention.

Referring now to FIG. 2, in accordance with various aspects and embodiments of the invention, a cache coherent interconnect 100 is illustrated in which various NIUs and modules connected to CPUs that can enter or exit the cache coherency system, or other elements within the interconnect 100, such as directories, are provided with at least one or more additional hardware blocks. Some of these hardware blocks are message builders, such as block 201 within the directory 120 and blocks 301 & 401, within the NIUs 130 & 140, respectively. Each of these message builders take inputs and generate a corresponding message, to be transmitted over the transport interconnect 111.

For the NIUs connected to elements that may enter/exit the system, the communication of the decision to enter/exit may be provided over dedicated wires connecting the CPU to it respective NIU. In FIG. 2, CPUs 30 & 40 are connected to message builders 301, 401 in their respective NIUs 130 & 140 through wires 131 & 141, respectively.

Referring again to FIG. 2, in accordance with various aspects and embodiments of the invention, some of the provided hardware blocks are message receivers, such as block 210 within the directory 120, and blocks 310 & 410 within the NIUs 130 & 140, respectively. Each of these message receivers take messages as inputs, and interpret the messages that carry information about the participation of elements within the cache coherent system, such as those produced by message builders 201, 301, and 401. Upon receipt, the information of the system status is decoded, and the corresponding agent, which is connected to its respective NIU, is informed.

For the NIUs connected to elements that need to be informed of other elements that enter/exit the system, the communication of a decision to enter/exit may be provided over dedicated wires connecting the NIU to the CPU. In FIG. 2, message receivers 310, 410 in their respective NIUs 130 & 140 are connected to CPUs 30 & 40 through wires 132 & 142, respectively.

In accordance with various aspects and embodiments of the invention, upon receiving an entry/exit message, the message receiver may generate an acknowledgement message. This acknowledgement message can encode that the entry/exit has been properly received, or can encode an error condition has occurred, or provide some other type of status information after the entry/exit message has been received. The acknowledgement message will be transported through the transport interconnect, and the designated destination for the acknowledgement message is typically the originator NIU/module that created the initial entry/exit message using a message builder.

Figure 3:
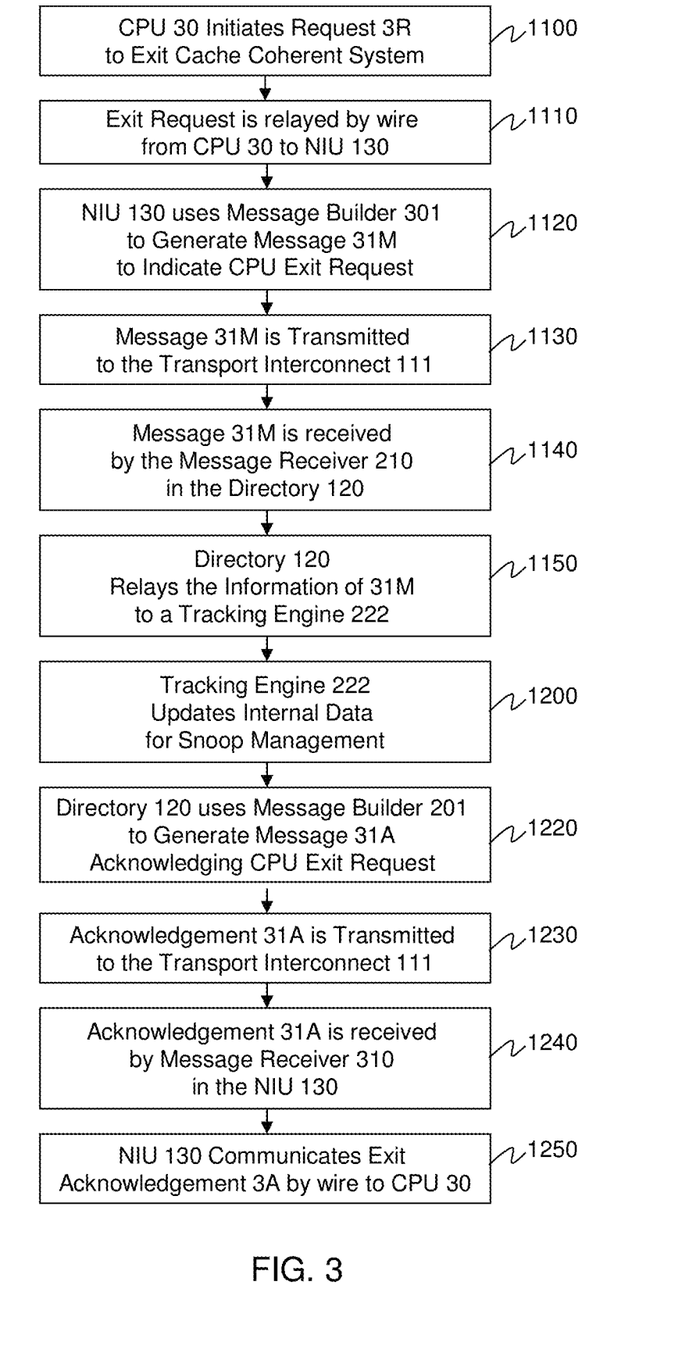
FIG. 3 presents a flow chart illustrating a method of entering/exiting the cache coherent interconnect in accordance with the various aspects and embodiments of the invention.
Figure 4:
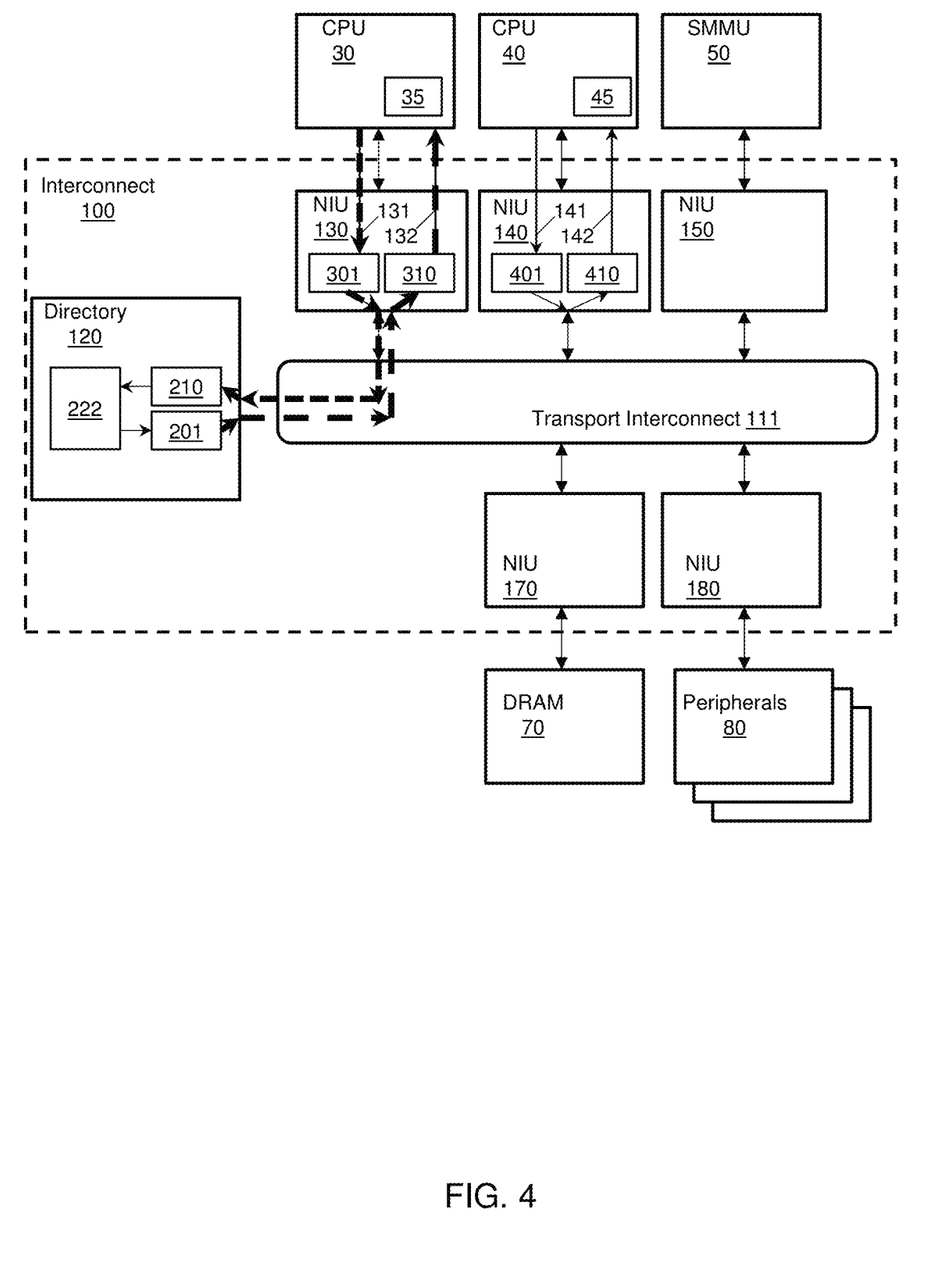
FIG. 4 illustrates a schematic of the signal flows for the method of the flow chart of FIG. 3 in accordance with the various aspects and embodiments of the invention.
Figure 5:
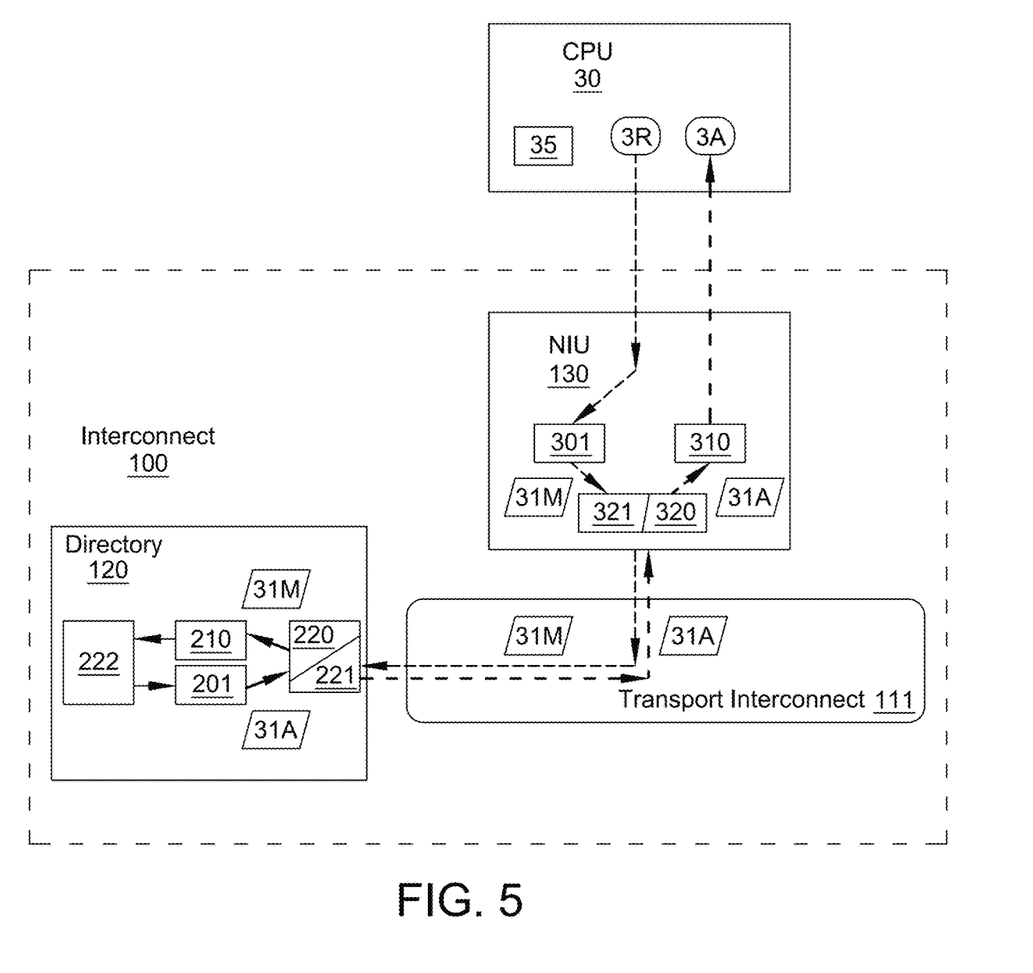
FIG. 5 illustrates a schematic of the signal flows for the method of the flow chart of FIG. 3, in which a multiplexer and demultiplexers are used in accordance with the various aspects and embodiments of the invention.

An example of using the entry/exit method within an interconnect according to some aspects and embodiments of the invention is illustrated in the flowchart of FIG. 3, and in FIG. 4 and FIG. 5. In this particular example, in step 1100, a CPU 30 makes a decision that it will no longer participate in the cache coherent network. The other elements need to be made aware of this decision to exit, and in particular, the directory 120 needs to updated, so that snoop filters inquiring into the status of the memory cache 35 of CPU 30 will no longer be generated. In step 1110, an exit request 3R is provided to NIU 130 via a signal via wire 131 from CPU 30.

In step 1120, after receiving the information about the exit request 3R, the message builder 301 generates a message 31M.

In step 1130, the message 31M is transported over the transport interconnect 111. In some embodiments, such as that illustrated in FIG. 5, a multiplexer 321 may be additionally provided, so that the message 31M may be combined with other messages that need to be sent from the NIU 130 to the system.

In step 1140, the message 31M is recognized and received by a message receiver 210 within the directory 120. In some embodiments, such as that illustrated in FIG. 5, a demultiplexer 220 may be additionally provided, so that the message 31M may be separated from other messages that are being distributed.

In step 1150, the message receiver 210 transmits the information to a tracking engine 222 internal to the directory 120. This tracking engine 222 keeps track of the elements that are part of and connected to the cache coherent system, and is responsible for generating snoop filters to probe the memory addresses throughout the system.

Although the example above shows only one directory with one tracking engine, in accordance with various aspects and embodiment of the invention, when directories are distributed, each directory element may additionally be provided with a tracking engine. Furthermore, in some embodiments, any agent (intellectual properties (IP) block) that needs to issue snoops may also be provided with a tracking engine.

In step 1200, this internal database of the tracking engine 222 is updated with the new information received in the message 31M. The memory cache 35 of CPU 30 will now be masked from any snoop requests from the directory 120.

Once the directory registers this new information, in step 1220, tracking engine 222 sends a signal that the update has been registered, and that the directory 120 should send an acknowledgement that the information was received. This acknowledgement 31A is then generated by a message builder 201 within the directory 120.

In step 1230, this acknowledgement 31A is transmitted from the directory 120 into the transport interconnect 111. In some embodiments, such as that illustrated in FIG. 5, a multiplexer 221 may be additionally provided, so that the acknowledgement 31A may be combined with other messages that need to be sent from the directory 120.

In step 1240, the NIU 130 associated with CPU 30 detects the acknowledgement 31A, and directs it to a message receiver 310. In some embodiments, such as that illustrated in FIG. 5, a demultiplexer 320 may be additionally provided, so that acknowledgement 31A may be separated from other messages arriving at the NIU 130. In step 1250, the exit acknowledgement 3A is provided from NIU 130 to CPU 30 by wire 132.

This illustrates the achievement of communicating the event of the exit of CPU 30 from the cache coherent environment without dedicating wires to connect with every element or agent of the system that may need this information.

When a CPU exits, the memory cache will first be synchronized so all other caches know about any modifications. Then, once synchronized, the memory cache can be flushed and the messages are sent so that the CPU is no longer participating in the cache coherent environment, and no snoop requests will be directed to it.

A similar protocol may be followed when a connected CPU wishes to signal that it intends to join the cache coherent network. After CPU initialization and enablement of its own cache memory, its connected NIU sends messages to the tracking engine that it is ready to participate and receive data and snoop requests.

In accordance with some aspects and embodiments of the invention, in a typical embodiment, no modification of the transport interconnect will be needed, and the entry/exit messages will use or adapt a message format already supported by the interconnect. In accordance with some aspects and embodiments of the invention, the interconnect is modified to allow transport of these messages as a new class of messages.

Likewise, in some embodiments, the multiplexers and demultiplexers may be standard hardware blocks, requiring no modification. In accordance with some aspects and embodiments of the invention, to accommodate communication to the message builders and message receivers, hardware blocks with an extra port may be needed.

Because it may happen that information about entry/exit from the system may need to be sent to multiple destinations, especially if the interconnect uses distributed directories, in accordance with various aspects and embodiments of the invention, a broadcast engine component may be used. When the broadcast engine gets an entry/exit message on its input or ingress port, the broadcast engine duplicates the information to be transmitted to multiple destinations, and sends the duplicated messages to each destination, either one after the other (serialized), or simultaneously if the broadcast engine has multiple sending ports connected to the interconnect.

Figure 6A:
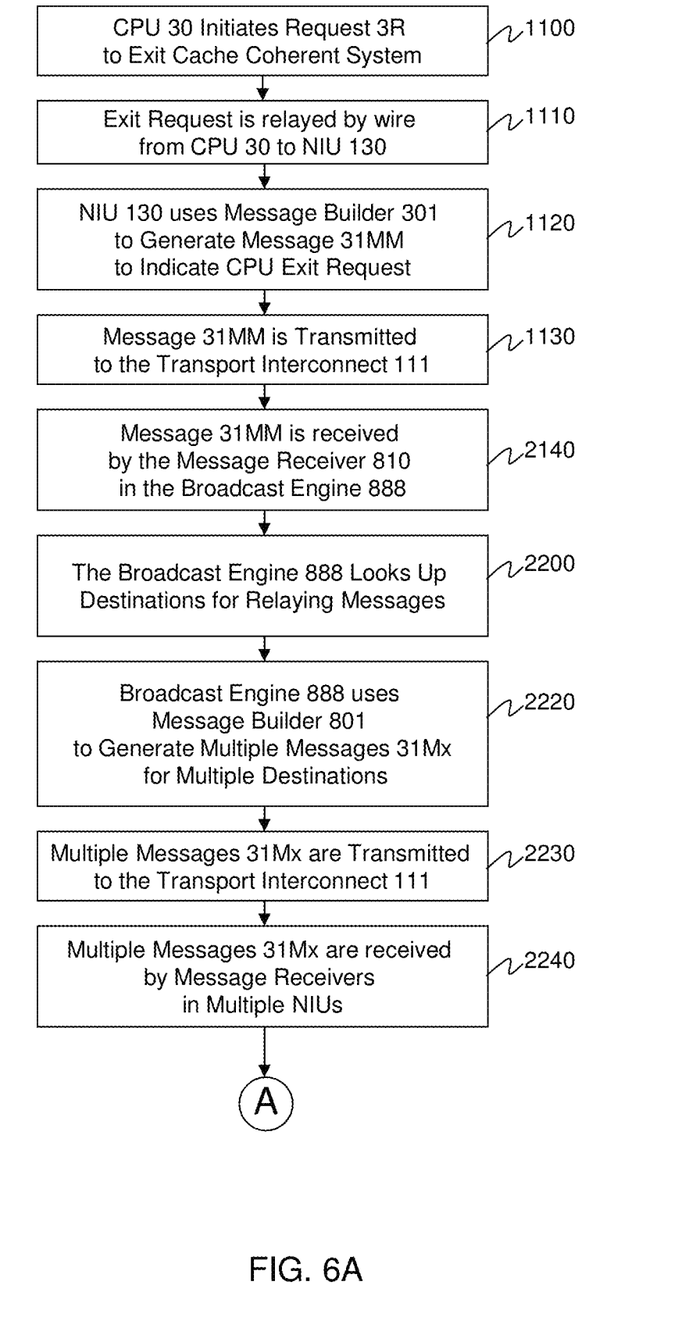
FIG. 6A presents a flow chart illustrating the first portion of a method of entering/exiting the cache coherent interconnect using a broadcast engine in accordance with the various aspects and embodiments of the invention.
Figure 6B:
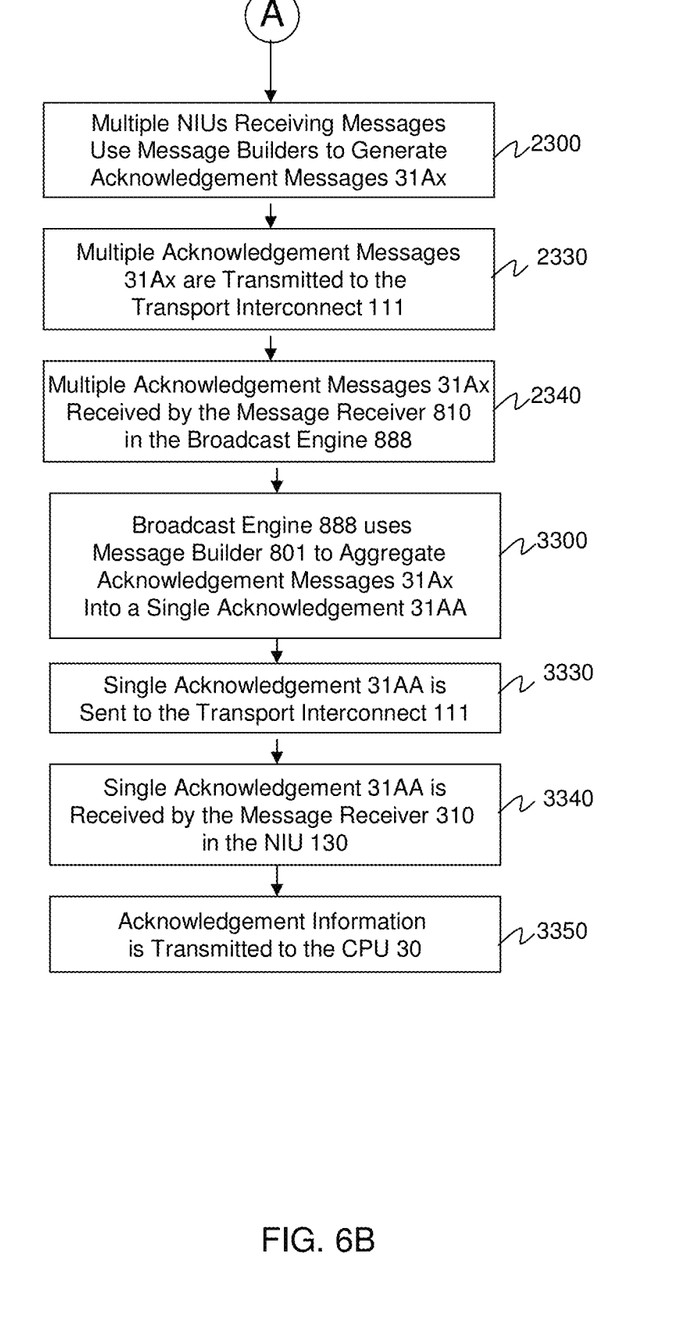
FIG. 6B presents a flow chart illustrating the second portion of a method of entering/exiting the cache coherent interconnect using a broadcast engine in accordance with the various aspects and embodiments of the invention.
Figure 7:
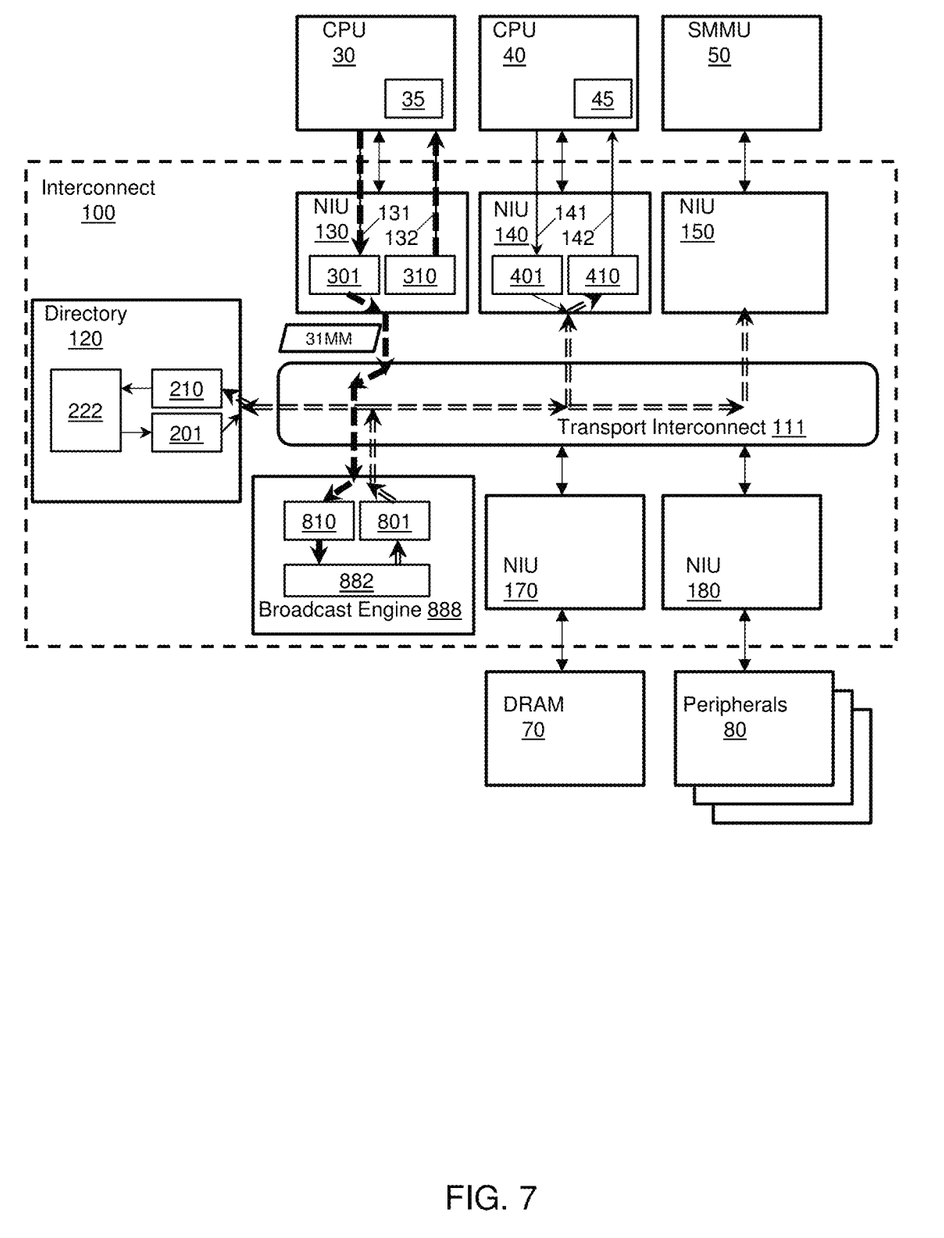
FIG. 7 illustrates a schematic of the signal flows for the method of the flow chart of FIGS. 6A and 6B in accordance with the various aspects and embodiments of the invention.

An example of this according to some embodiments of the invention is shown in the flow charts of FIGS. 6A and 6B, and illustrated in the schematic of FIG. 7.

In accordance with some aspects and embodiments of the invention, the initial steps are as in the previous example for a CPU announcing its exit from the cache coherent system. In step 1100, a CPU 30 makes a decision that it will no longer participate in the cache coherent network. The other elements in the network need to be made aware of this decision. In this example, the directory 120 needs to updated as well as other elements, such as CPU 40 and SMMU 50, need to be informed. As before, in step 1110, an exit request 3R is provided to NIU 130 with a signal via wire 131 from the CPU 30. As before, in step 1120, after receiving the information about the exit request 31, the message builder 301 generates a message 31MM that is then, in step 1130, transported over the transport interconnect 111. For this example, the designation "31MM" is used to suggest that this message has multiple destinations, and not just the directory as a single destination. In step 2140, the message 31MM is recognized and received by a message receiver 810 within the broadcast engine 888.

In step 2200, the broadcast engine 888 refers to an internal database of destinations 882, which provides the information needed to distribute the exit information of message 31MM. Once this new information has been provided, in step 2220, the message builder 801 generates multiple messages 31M1, 31M2, . . . , 31Mm (collectively, 31Mx) to be distributed to m multiple destinations throughout the network.

In step 2230, these multiple messages 31Mx are sent from the broadcast engine 888 and distributed using the transport interconnect 111. In some embodiments, at step 2240, these multiple messages 31Mx are then transported over the transport interconnect 111 and are received by their respective destinations, which may include various NIUs, such as NIU 140 for the second CPU 40 and NIU 150 for the SMMU 50.

Proceeding further, as shown in FIG. 6B, in step 2300, once an NIU with an associated message receiver detects an enter/exit message from the set 31Mx designated for it, the NIU can then use its associated message builder to generate an acknowledgement message. For each message 31M1, 31M2, 31Mm, there can be an acknowledgement message 31A1, 31A2, . . . , 31Am, respectively generated by each receiving element. In step 2330, these respective acknowledgement messages 31Ax are then transmitted to the transport interconnect 111. In step 2340, these respective acknowledgement messages 31Ax are detected and received by the message receiver 810 of the broadcast engine 888.

In step 3300, the broadcast engine 888 uses its message builder 801 to aggregate all the received acknowledgements 31Ax into a single acknowledgement response 31AA. In step 3330, the aggregated acknowledgement 31AA is provided from the broadcast engine 888 to the transport interconnect 111. In step 3340 the aggregated acknowledgement 31AA is recognized and received by the message receiver in the originating NIU (in this example, message receiver 310 in NIU130). In step 3350 the information in the aggregated acknowledgement 31AA is transmitted from the NIU130 to the CPU 30.

In accordance with various aspects and embodiments of the invention, the broadcast engine may receive multiple responses from the destinations of a broadcasted message, and perform response aggregation, before sending a unique response to the sender. However, during response aggregation, a response combination function is used to generate a unique response from possibly different responses. For instance, if 3 responses are expected, and 2 come back as OK but one is in error, the response combination function may decide that the resulting response is in error. Various response combination functions may be used in various embodiments of the invention.

In some embodiments, the directory of the system actually comprises multiple individual directory units, each responsible for a subset of the addresses. In this case, an entry/exit message from a cache coherent agent needs to reach all the directory units. In this situation, using a broadcast engine to communicate entry/exit messages throughout the system will enable higher performance compared to serially sending the same message to all directory units.

In some embodiments, a multiplexer may be additionally provided within the broadcast engine, so that incoming messages related to the entry/exit of elements from the network can be separated from other messages arriving at the broadcast engine. In some embodiments, a demultiplexer may be additionally provided within the broadcast engine, so that outgoing messages related to the entry/exit of elements from the network can be combined from other messages to be distributed to the network.

With this Application, several embodiments of the invention, including the best mode contemplated by the inventors, have been disclosed. It will be recognized that, while specific embodiments may be presented, elements discussed in detail only for some embodiments may also be applied to others.

While specific materials, designs, configurations and fabrication steps have been set forth to describe this invention and the preferred embodiments, such descriptions are not intended to be limiting. Modifications and changes may be apparent to those skilled in the art, and it is intended that this invention be limited only by the scope of the appended claims.

Several embodiments of the invention, including the best mode contemplated by the inventors, have been disclosed. It will be recognized that, while specific embodiments may be presented, elements discussed in detail only for some embodiments may also be applied to others.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

The scope of the invention, therefore, is not intended to be limited to the exemplary embodiments shown and described herein. Rather, the scope and spirit of present invention is embodied by the appended claims.

What is claimed is:

1. A method of communicating an agent's coherency state when the agent is within a cache coherent environment, which is using an interconnect, and the agent is capable of exiting the cache coherent environment the method comprising:
generating, at the agent in communication with a network interface unit (NIU) and the NIU is in communication with the interconnect, a signal that indicates that the agent is doing one of entering the cache coherent environment or exiting the cache coherent environment;
generating, in response to the signal, an initial message using a message builder of the NIU;
transmitting, using the interconnect, the initial message to a directory, which is in communication with the interconnect and includes a tracking engine that tracks a plurality of agents within the cache coherent environment;
sending, from the directory to the agent, an acknowledgement message indicating that the signal was received thereby allowing the agent to exit the cache coherent environment; and
preventing, using the tracking engine, snoops from being sent to the agent when the initial message indicates the agent is exiting the cache coherent environment.

2. The method of claim 1, wherein the acknowledgement message is sent to the NIU of the agent.

3. An interconnect with a cache coherent memory environment, the interconnect comprising:
- a transport interconnect;
- a directory capable of sending snoop requests, the directory including:
  - a directory message receiver;
  - a directory message builder; and
  - a tracking engine to track memory locations within the cache coherent memory environment; and
- one or more network interface units (NIUs) in communication with the transport interconnect, wherein each of the NIUs connects to one agent and at least one of the NIUs is connected to a first agent and includes at least one of:
  - a message builder; and
  - a message receiver,
- wherein the cache coherent memory environment is maintained among one or more agents,
- wherein the first agent generates a signal that is sent to the first agent's NIU to indicate that the first agent is to either enter the cache coherent memory environment or exit the cache coherent memory environment,
- wherein the message builder of the first agent's NIU generates an initial message in response to the signal and the initial message is sent to the directory message receiver of the directory, and
- wherein the directory message builder of the directory generates and sends an acknowledgement message to the message receiver of the first agent's NIU indicating that the signal was received, such that if the first agent exits the cache coherent memory environment, then the tracking engine prevents the directory from sending snoop requests to the first agent and if the first agent enters the cache coherent memory environment, then the tracking engine allows the directory to begin sending snoop requests to the first agent.

4. The interconnect of claim 3, wherein in response to the signal, the message builder provided with the first agent's NIU generates the initial message for transmission over the transport interconnect and the initial message is formatted to communicate the first agent's instruction to enter or exit the cache coherent memory environment to the directory.

5. The interconnect of claim 4, wherein the directory includes a message receiver that detects the initial message and in response generates the acknowledgement message that is transmitted through the transport interconnect to the first agent.

6. The interconnect of claim 5, wherein a message receiver provided with the first agent's NIU detects the acknowledgement message.

7. The interconnect of claim 4, wherein the first agent's NIU includes at least one multiplexor that combines the initial message with other messages generated by the first agent's NIU.

8. The interconnect of claim 7, wherein the first agent's NIU includes at least one demultiplexer that extracts messages received from the transport interconnect and directs extracted messages related to any agent's instruction to enter/exit the cache coherent memory environment to the message receiver.

9. The interconnect of claim 4 further comprising a broadcast engine connected to the transport interconnect, wherein the broadcast engine is configured to:
- receive the initial message;
- generate duplicated messages representing the initial message, wherein one duplicated message is generated for each of a plurality of egress ports; and
- send the duplicated messages along the egress ports to a plurality of destinations.

10. The interconnect of claim 9, wherein the broadcast engine is further configured to:
- receive acknowledgement messages from the plurality of destinations; and
- generate a single aggregated acknowledgement message from the received acknowledgement messages.

11. The interconnect of claim 3, wherein each agent is selected from the group comprising: a central processing unit (CPU), a graphical processing unit (GPU), an accelerator, a system memory management unit (SMMU), a connection module to a Compute Express Link (CXL™) interface, a peripheral access interface, and a system memory interface and wherein each agent's NIU is a protocol converter.

* * * * *